United States Patent
Beitz et al.

(10) Patent No.: US 11,604,300 B2
(45) Date of Patent: *Mar. 14, 2023

(54) CONSTRAINT OF DITHERING OF SOURCE ACTUATIONS

(71) Applicant: PGS Geophysical AS, Oslo (NO)

(72) Inventors: Manuel Beitz, Houston, TX (US); Christian Strand, Houston, TX (US); Rolf Huibert Baardman, Weybridge (GB)

(73) Assignee: PGS Geophysical AS, Oslo (NO)

( * ) Notice: Subject to any disclaimer, the term of this patent is extended or adjusted under 35 U.S.C. 154(b) by 273 days.

This patent is subject to a terminal disclaimer.

(21) Appl. No.: 16/743,664

(22) Filed: Jan. 15, 2020

(65) Prior Publication Data

US 2020/0150303 A1    May 14, 2020

Related U.S. Application Data

(63) Continuation of application No. 15/627,508, filed on Jun. 20, 2017, now Pat. No. 10,571,589.

(60) Provisional application No. 62/376,048, filed on Aug. 17, 2016.

(51) Int. Cl.
*G01V 1/38* (2006.01)
*G01V 1/00* (2006.01)

(52) U.S. Cl.
CPC .......... *G01V 1/3861* (2013.01); *G01V 1/005* (2013.01); *G01V 1/38* (2013.01); *G01V 1/3808* (2013.01); *G01V 2210/127* (2013.01)

(58) Field of Classification Search
CPC ........ G01V 1/3861; G01V 1/005; G01V 1/38; G01V 1/3808; G01V 2210/127
See application file for complete search history.

(56) References Cited

U.S. PATENT DOCUMENTS 6,906,981 B2    6/2005 Vaage
9,075,162 B2    7/2015 Baardman et al.
(Continued)

FOREIGN PATENT DOCUMENTS

WO    2016009270    1/2016

OTHER PUBLICATIONS

Baardman, et al., "A Simulated Simultaneous Source Experiment in Shallow Waters and the Impact of Randomization Schemes"; SEG Houston 2013 Annual Meeting (Accessed: Sep. 12, 2016) (5 pgs).
(Continued)

*Primary Examiner* — Ian J Lobo (57) ABSTRACT

Systems and computer readable media are described that actuate at least one marine seismic source according to a constrained sequence. The sequence exhibits an actuation time or distance interval between each actuation. The actuation time or distance interval corresponds to the sum of a nominal time or distance and a respective dither time or dither distance for each actuation. The sequence is constrained such that differences between consecutive dither times or dither distances remain within a threshold dither difference. Constraining the sequence according to the threshold dither difference enables increased bottom speeds for the source (i.e., increased speeds of the source relative to the seafloor), while still maintaining at least a minimum actuation time or distance interval for the source, taking into account both the nominal time or distance and the respective dither times or dither differences.

19 Claims, 5 Drawing Sheets

(56) References Cited

U.S. PATENT DOCUMENTS

| | | | |
|---|---|---|---|
| 10,386,518 B2* | 8/2019 | Peng | G01V 1/364 |
| 10,571,589 B2* | 2/2020 | Beitz | G01V 1/3808 |
| 2014/0269169 A1 | 9/2014 | Van Borselen et al. | |
| 2014/0362663 A1 | 12/2014 | Jones et al. | |
| 2015/0234066 A1* | 8/2015 | Poole | G01V 1/364 |
| | | | 702/14 |
| 2017/0082761 A1 | 3/2017 | Li et al. | |
| 2017/0184746 A1 | 6/2017 | Halliday et al. | |
| 2017/0276774 A1 | 9/2017 | Ni et al. | |

OTHER PUBLICATIONS

Fromyr, et al., "Flam—A Simultaneous Source Wide Azimuth Test"; SEG Las Vegas 2008 Annual Meeting Accessed: Sep. 12, 2016) (5 pgs).

Hager, et al., "Efficient Multi-Source and Multi-Streamer Configuration for Dense Cross-Line Sampling"; 2015 SEG New Orleans Annual Meeting (5 pgs).

Polarcus; "XArray: Controlled Soundfield Sampling"; Aug. 2015, vol. 2 (8 pgs).

International Search Report & Written Opinion for related PCT Application PCT/EP2017/070873, dated Nov. 14, 2017 (13 pgs).

Bagaini, et al., "Dithered Slip-Sweep Acquisition"; 2010 SEG, SEG Denver 2010 Annual Meeting; (Jan. 1, 2010) (5 pgs).

"Processing and Transforming Collected Data"; ip.com Journal, ip.com, Inc., West Henrietta, NY, US (Sep. 4, 2014) (50 pgs).

International Preliminary Report on Patentability for related PCT Application PCT/EP2017/070873, dated Feb. 28, 2019 (8 pgs).

\* cited by examiner

CONSTRAINT OF DITHERING OF SOURCE ACTUATIONS

CROSS-REFERENCE TO RELATED APPLICATIONS

This application is a Continuation of U.S. Non-Provisional application Ser. No. 15/627,508, filed Jun. 20, 2017 and published as U.S. Publication No. 2018-0052248 A1 on Feb. 22, 2018, which claims priority to U.S. Provisional Application 62/376,048, filed Aug. 17, 2016, which is incorporated by reference.

BACKGROUND

In the past few decades, the petroleum industry has invested heavily in the development of marine seismic survey techniques that yield knowledge of subterranean formations beneath a body of water in order to find and extract valuable mineral resources, such as oil. High-resolution images of a subterranean formation are helpful for quantitative interpretation and improved reservoir monitoring. For a typical marine survey, a marine survey vessel tows one or more sources below the water surface and over a subterranean formation to be surveyed for mineral deposits. Receivers may be located on or near the seafloor, on one or more streamers towed by the marine survey vessel, or on one or more streamers towed by another vessel. The marine survey vessel typically contains marine survey equipment, such as navigation control, source control, receiver control, and recording equipment. The source control may cause the one or more sources, which can be air guns, marine vibrators, etc., to produce signals at selected times. Each signal is essentially a wave called a wavefield that travels down through the water and into the subterranean formation. At each interface between different types of rock, a portion of the wavefield may be refracted, and another portion may be reflected, which may include some scattering, back toward the body of water to propagate toward the water surface. The receivers thereby measure a wavefield that was initiated by the actuation of the source.

DETAILED DESCRIPTION

This disclosure is related generally to the field of marine surveying. For example, this disclosure may have applications in marine surveying, in which one or more sources are used to generate wavefields, and sensors (towed or ocean bottom) receive energy generated by the sources and affected by the interaction with a subsurface formation. The sensors thereby collect marine survey data, which can be useful in the discovery or extraction of hydrocarbons from subsurface formations.

In a marine survey, a source may be activated in a sequence with a delay between actuations of the source, hereinafter referred to as an actuation time interval. A source may be activated in a sequence with a distance between actuations of the source, hereinafter referred to as an actuation distance. The actuation time interval or the actuation distance can be short such that a signal corresponding to a first actuation of the source overlaps a signal corresponding to a second actuation of the source. Alternatively, at least two sources may be actuated with a short actuation time interval or a short actuation distance such that a signal corresponding to the actuation of a first source overlaps a signal corresponding to the actuation of a second source. The actuation time interval can comprise a nominal time and a dither time. As used herein, "nominal time" refers to an amount of time between consecutive nominal actuation points. As used herein, "nominal actuation points" refer to predetermined points on a survey path sailed by a marine survey vessel at which a source may be actuated. Nominal actuation points can be spaced apart by a predefined nominal time. The actuation distance can comprise a nominal distance and a dither distance. The nominal actuation points can be spaced apart by a predefined nominal distance. As used herein, "nominal distance" refers to a distance between consecutive nominal actuation points. For example, if the nominal time is predefined as five seconds, then the nominal distance would be the distance traveled by a source at a bottom speed during the five seconds between consecutive nominal actuation points. As used herein, "bottom speed" refers to the speed of a source relative to the seafloor. Conversely, if the nominal distance is predefined as 12.5 meters, then the nominal time would be the amount of time required for a source to travel the 12.5 meters between consecutive nominal actuation points at a predetermined bottom speed.

Actuations can be dithered to improve the separation process of a signal corresponding to a first actuation from a signal corresponding to a second actuation where the two signals overlap. Actuations can be dithered temporally or spatially. Actuations can be dithered temporally by using a dither time to distinguish the signal corresponding to the first actuation from the signal corresponding to the second actuation. As used herein, "dither time" refers to a randomized amount of time that can be added to the nominal time. Actuations can be dithered spatially by using a dither distance to distinguish the signal corresponding to the first actuation from the signal corresponding to the second actuation. As used herein, "dither distance" refers to a randomized distance that can be added to the nominal distance. The dither time can be generated via a randomization scheme such that the randomized amount of time is pseudorandom. Embodiments herein are not limited to any particular randomization scheme. A positive dither time will cause the actuation time interval to be greater than the nominal time whereas a negative dither time will cause the actuation time interval to be less than the nominal time. The dither time can be between a maximum negative dither time and a maximum positive dither time. Similarly, a positive dither distance will cause the actuation distance to be greater than the nominal distance whereas a negative dither distance will cause the actuation distance to be less than the nominal distance. The dither distance can be between a maximum negative dither distance and a maximum positive dither distance. As a result of dithering actuations, coherency measures in the proper domains, or other techniques, can be utilized to actively separate the recorded data over the individual sources. The dither time or the dither distance can be used in a deblending process to distinguish the signal corresponding to the first actuation from the signal corresponding to the second actuation.

A problem with dithering actuations of a source may be that the distance between consecutive actuations at actuation points as well as the time between the consecutive actuations at the actuation points may be affected by the dither times. As used herein, "actuation points" refer to points at which a source is actuated rather than points at which a source may be actuated. Thus, in order to maintain a minimum actuation time interval between consecutive actuations, the bottom speed at which a source moves through a fluid volume may have to change during the marine survey to accommodate the varying distances and times between the pairs of consecutive actuations associated with dithering the actuations. However, by constraining a dither time difference to a threshold dither time difference that is less than a maximum dither time difference, a faster bottom speed can be maintained during a survey for any dither time difference up to and including the threshold dither time difference. As used herein, "dither time difference" refers to a difference between a dither time corresponding to an actuation and a dither time corresponding to a directly precedent actuation. At least one embodiment in accordance with the present disclosure includes constraining a difference between a first dither time corresponding to a first actuation of a source and a second dither time corresponding to a second actuation of a source, where the first actuation is directly precedent to the second actuation.

It is to be understood the present disclosure is not limited to particular devices or methods, which may, of course, vary. It is also to be understood that the terminology used herein is for the purpose of describing particular embodiments only, and is not intended to be limiting. As used herein, the singular forms "a", "an", and "the" include singular and plural referents unless the content clearly dictates otherwise. Furthermore, the word "may" is used throughout this application in a permissive sense (having the potential to, being able to), not in a mandatory sense (must). The term "include," and derivations thereof, mean "including, but not limited to." The term "coupled" means directly or indirectly connected.

The figures herein follow a numbering convention in which the first digit or digits correspond to the drawing figure number and the remaining digits identify an element or component in the drawing. Similar elements or components between different figures may be identified by the use of similar digits. For example, 230-1 may reference element "30-1" in FIG. 2A, and a similar element may be referenced as 330-1 in FIG. 3A. As will be appreciated, elements shown in the various embodiments herein can be added, exchanged, or eliminated so as to provide a number of additional embodiments of the present disclosure. In addition, as will be appreciated, the proportion and the relative scale of the elements provided in the figures are intended to illustrate certain embodiments of the present invention, and should not be taken in a limiting sense.

Figure 1:
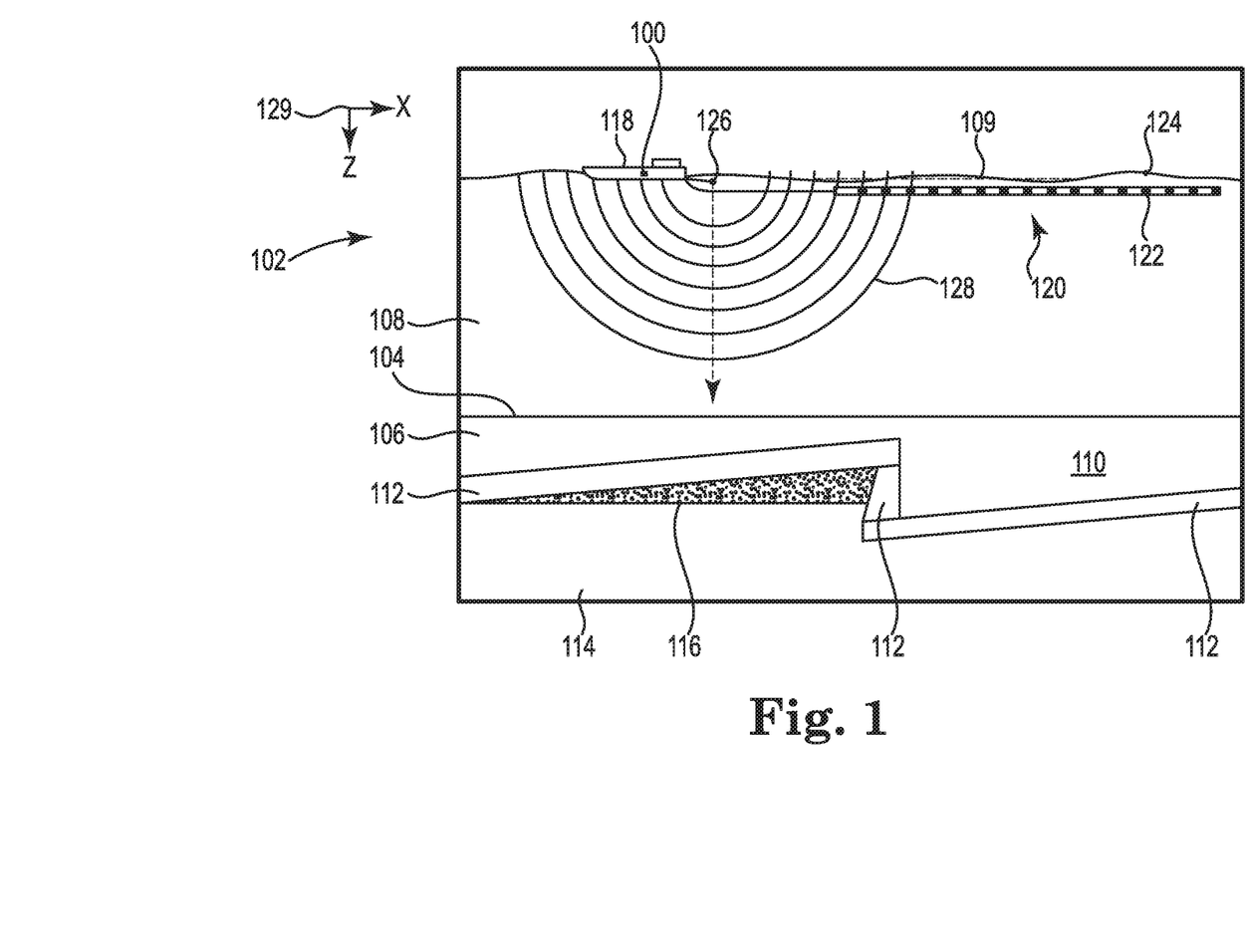
FIG. 1 illustrates an elevation or xz-plane view of marine seismic surveying in which acoustic signals are emitted by a source for recording by receivers.

FIG. 1 illustrates an elevation or xz-plane 129 view of marine seismic surveying in which acoustic signals are emitted by a source 126 for recording by receivers 122. Processing and analysis of the data can be performed in order to help characterize the structures and distributions of features and materials underlying the solid surface of the earth. FIG. 1 illustrates a domain volume 102 of the earth's surface comprising a solid volume 106 of sediment and rock below the solid surface 104 of the earth that, in turn, underlies a fluid volume 108 of water having a water surface 109 such as in an ocean, an inlet or bay, or a large freshwater lake. The domain volume 102 shown in FIG. 1 represents an example experimental domain for marine seismic surveys. FIG. 1 illustrates a first sediment layer 110, an uplifted rock layer 112, a second, underlying rock layer 114, and hydrocarbon-saturated layer 116. One or more elements of the solid volume 106, such as the first sediment layer 110 and the first uplifted rock layer 112, can be an overburden for the hydrocarbon-saturated layer 116. In some instances, the overburden may include salt.

In the example of FIG. 1, the marine survey vessel 118 is a marine seismic survey vessel equipped to carry out marine seismic surveys. However, the marine survey vessel 118 can be a marine electromagnetic (EM) survey vessel equipped to carry out marine EM surveys. The marine survey vessel 118 can tow the source 126 such that the source 126 moves through the fluid volume 108 at a bottom speed. The marine survey vessel 118 can tow one or more streamers 120 (shown as one streamer for ease of illustration) generally located below the water surface 109. The streamers 120 can be long cables containing power and data-transmission lines (electrical, optical fiber, etc.) to which receivers may be connected. A controller 100 can be onboard the marine survey vessel 118 and coupled to the source. The controller 100 can be configured to actuate the source 126 in sequence with an actuation time interval between each actuation and constrain the dither time for each actuation such that a reduction of the actuation time interval relative to a directly precedent actuation time interval is at most a threshold dither time difference. The actuation time interval can comprise a sum of a nominal time and a dither time for each actuation. The threshold dither time difference can correspond to a maximum bottom speed. The sequence can be an actuation sequence such that there is an actuation time interval between the actuations as described above. The controller 100 can be configured to actuate the source 126 as the source 126 moves through the fluid volume 108 at a bottom speed. The bottom speed can correspond to the speed of the marine survey vessel 118 taking into account adjustments for currents and waves.

Where the source 126 is a source array comprising more than one source, the controller 100 can be configured to actuate a first source of the source array with a first dither time and, directly subsequent to the actuation of the first source, actuate a second source of the source array after the actuation time interval comprising the nominal time and a second dither time. The controller 100 can be configured to constrain a difference between the first dither time and the second dither time to at most the threshold dither time difference. The difference between the dither times associated with two consecutive actuations (a second actuation directly subsequent to a first actuation) can be constrained to at most a threshold dither time difference, irrespective of the consecutive actuations being actuations of a single source or consecutive actuations of more than one source (a first source and then a second source). The sources of a source array can be towed by a single marine survey vessel 118. The sources of a source array can be towed by more than one marine survey vessel 118. For example, each of the sources can be towed by a different marine survey vessel 118. In at least one embodiment, a first subset of the sources of a source array can be towed by a first marine survey vessel 118 and a second subset of the sources of the source array can be towed by a second marine survey vessel 118.

The source 126 can be actuated with a short actuation time interval or a short actuation distance in between consecutive actuations of the source 126. If the actuation time interval or the actuation distance is short enough, a signal from an actuation of the source 126 may overlap, or blend with, a signal from a directly subsequent actuation of the source 126. That is, the actuation of the source 126 may produce a first reflected wavefield that is recorded by the receivers 122 on the streamers 120 at the same time that a second reflected wavefield produced by the directly subsequent actuation of the source 126 is recorded by the receivers 122 on the streamers 120. However, the receivers 122 may not identify the reflected wavefields as corresponding to a particular actuation. By dithering the actuations, it can be possible, for example, in post-processing, to use the dither time or the dither distance corresponding to each actuation to associate a recorded reflected wavefield with the actuation of the source that produced it. A deblending engine can be configured to distinguish marine survey data corresponding to a first actuation of the source 126 from marine survey data corresponding to a second actuation of the source 126 via a dither time for each actuation.

The streamers 120 and the marine survey vessel 118 can include sophisticated sensing electronics and data-processing facilities that allow receiver readings to be correlated with absolute positions on the water surface and absolute three-dimensional positions with respect to a three-dimensional coordinate system. In FIG. 1, the receivers along the streamers are shown to lie below the water surface 109, with the receiver positions correlated with overlying surface positions, such as a surface position 124 correlated with the position of receiver 122. The marine survey vessel 118 can also tow one or more sources 126, comprising a source array, that produce acoustic signals as the marine seismic survey vessel 118 and streamers 120 move across the water surface 109. Sources 126, streamers 120, or sources 126 and streamers 120 may also be towed by other vessels, or may be otherwise disposed in fluid volume 108. For example, receivers may be located on ocean bottom cables or nodes fixed at or near the solid surface 104, and sources 126 may also be disposed in a nearly-fixed or fixed configuration. For the sake of efficiency, illustrations and descriptions herein show seismic receivers located on streamers, but it should be understood that references to seismic receivers located on a "streamer" or "cable" should be read to refer equally to seismic receivers located on at least one of a towed streamer, an ocean bottom receiver cable, or an array of nodes. The receivers can be configured to receive marine survey data from consecutive actuations of the source.

FIG. 1 illustrates an expanding, spherical acoustic signal, illustrated as semicircles of increasing radius centered at the source 126, representing a down-going wavefield 128, following an acoustic signal emitted by the source 126. The down-going wavefield 128 is, in effect, shown in a vertical plane cross section in FIG. 1. The outward and downward expanding down-going wavefield 128 may eventually reach the solid surface 104, at which point the outward and downward expanding down-going wavefield 128 may partially scatter, may partially reflect back toward the streamers 120, and may partially refract downward into the solid volume 106, becoming elastic signals within the solid volume 106.

Figure 2:
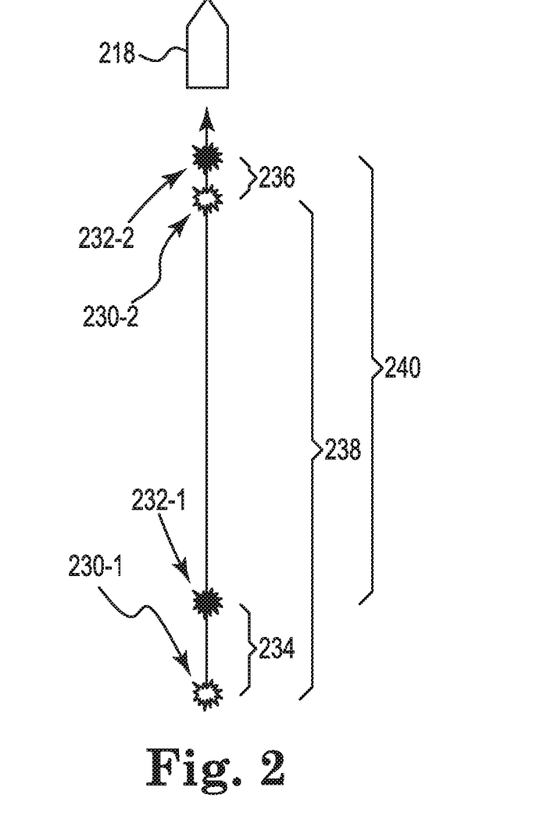
FIG. 2 illustrates an approach to dithering actuations of a source.

FIG. 2 illustrates an approach to dithering actuations of a source. The source can be towed by the marine seismic vessel 218 at a bottom speed. The source, such as the source 126 illustrated in FIG. 1, may or may not be actuated at the nominal actuation points depending on the dithering of an actuation corresponding to an actuation point. For example, if a dither time corresponding to the nominal actuation point 230-1 is zero seconds, then the actuation point 232-1 will be the corresponding nominal actuation point 230-1. In contrast, if a dither time corresponding to the nominal actuation point 230-1 is positive, then the actuation point 232-1 will be past the nominal actuation point 230-1 or if a dither time corresponding to the nominal actuation point 230-1 is negative, then the actuation point 232-1 will be before the nominal actuation point 230-1. Consecutive actuations of a source can be separated by an actuation time interval. A minimum actuation time interval can correspond to a period of clean recording during which a signal corresponding to an actuation of a source does not overlap a signal corresponding to a subsequent actuation of the source. A dither time can be described as a dither distance by multiplying the dither time by the bottom speed.

The first dither distance 234 corresponds to the nominal actuation point 230-1 and a second dither distance 236 corresponds to the nominal actuation point 230-1. In the example of FIG. 2, the actuations are temporally dithered such that the first dither distance 234 and the second dither distance 236 are determined from dither times. That is, the dither time can correspond to a distance offset from the nominal actuation points 230-1 and 230-2. However, embodiments are not so limited and actuations can be spatially dithered such that dither times can be determined from the dither distances. An actuation time interval can be determined by subtracting the dither time difference from the nominal time. An actuation distance 240 between actuations can be determined from the actuation time interval by multiplying the actuation time interval by the bottom speed. The actuation distance 240 can include a first portion corresponding to clean recording during which a signal corresponding to an actuation of a source does not overlap a signal corresponding to a subsequent actuation of the source and a second portion during which the signal corresponding to the actuation of the source overlaps the signal corresponding to the subsequent actuation of the source.

A velocity can be described as a distance traveled divided by a time in which the distance is traveled. Thus, a time in which a distance is traveled can be described as the distance traveled divided by a velocity. For example, given a minimum actuation time interval ($T_{MIN}$), a nominal distance ($D_N$) 238, and a dither time difference ($\Delta T_D$), a maximum bottom speed ($S_{MAX}$) can be determined. $S_{MAX}$ refers to a maximum bottom speed at which the source can travel such that there is at least the minimum actuation time interval ($T_{MIN}$) between consecutive actuations at the actuation points 232-1 and 232-2 for the dither time difference ($\Delta T_D$). The relationship between the minimum actuation time interval ($T_{MIN}$), the nominal distance ($D_N$) 238, the dither time difference ($\Delta T_D$), and the maximum bottom speed ($S_{MAX}$) can be described as follows:

$$T_{MIN} = \frac{D_N - S_{MAX}\Delta T_D}{S_{MAX}} \qquad (1)$$

Solving Expression (1) for $S_{MAX}$ yields:

$$S_{MAX} = \frac{D_N}{T_{MIN} + \Delta T_D} \qquad (2)$$

Similarly, given a minimum actuation time interval ($T_{MIN}$), a nominal distance ($D_N$) 238, and a dither distance difference ($\Delta D_D$), a maximum bottom speed ($S_{MAX}$) can be determined. As used herein, "dither distance difference" refers to a difference between a dither distance corresponding to an actuation and a dither distance corresponding to a directly precedent actuation. The dither distance difference ($\Delta D_D$) can be the first dither distance 234 minus the second dither distance 236. $S_{MAX}$ refers to a maximum bottom speed at which the source can travel such that there is at least the minimum actuation time interval ($T_{MIN}$) between consecutive actuations at the actuation points 232-1 and 232-2 for the dither distance difference ($\Delta D_D$). The relationship between the minimum actuation time interval ($T_{MIN}$), the nominal distance ($D_N$) 238, the dither distance difference ($\Delta D_D$), and the maximum bottom speed ($S_{MAX}$) can be described as follows:

$$T_{MIN} = \frac{D_N - \Delta D_D}{S_{MAX}} \quad (3)$$

Solving Expression (3) for $S_{MAX}$ yields:

$$S_{MAX} = \frac{D_N + \Delta D_D}{T_{MIN}} \quad (4)$$

The following example is provided to illustrate the effect of temporally dithering actuations on timing and spacing of the actuations. In the example of FIG. 2, the minimum actuation time interval ($T_{MIN}$) is five seconds and a nominal distance 238 between nominal actuation points 230-1 and 230-2 is 12.5 meters. Without dithering the actuations, in order to sail the nominal distance ($D_N$) 238 of 12.5 meters with the minimum actuation time interval ($T_{MIN}$) of five seconds between the actuations, the bottom speed can be 2.5 meters per second (4.9 knots).

Now, assume that the actuations in the example of FIG. 2 are dithered. The dither time corresponding to the nominal actuation point 230-1 is one second and the dither time corresponding to the nominal actuation point 230-2 is zero seconds. Although a zero dither time would mean that the nominal actuation point 230-2 would be same as the actuation point 232-2 (the second dither distance 236 being zero meters), FIG. 2 shows the actuation point 232-2 being separated from the actuation point 230-2 for illustration purposes only. If the bottom speed was 2.5 meters per second (the speed to travel 12.5 meters in five seconds), the first dither distance 234 would be 2.5 meters and the second dither distance 236 would be zero meters. Based on a bottom speed of 2.5 meters per second and a dither time difference ($\Delta T_D$) of one second, the actuation distance 240 between actuations would be ten meters (the nominal distance 238, 12.5 meters, minus the difference between the first dither distance 234, 2.5 meters, and the second dither distance 236, zero meters). The actuation distance 240 is represented in Expression (1) by $D_N - S_{MAX}\Delta T_D$. A dither time of one second followed by a dither time of zero seconds would result in the time between actuations at the actuation points 232-1 and 232-2 being four seconds. Thus, instead of traveling 12.5 meters in five seconds, the source would travel the actuation distance 240 of ten meters in four seconds. In order to maintain the minimum actuation time interval ($T_{MIN}$) of five seconds, the bottom speed would have to be reduced to be slower than 2.5 meters per second (4.9 knots) such that the source travels the actuation distance 240 of approximately ten meters (because the bottom speed is reduced the distance traveled within the one second difference is reduced as well) in the minimum actuation time interval ($T_{MIN}$) of five seconds.

Expression (2) can be used to determine the maximum bottom speed ($S_{MAX}$) such that the source travels the actuation distance 240 of ten meters, resulting from the dither time difference ($\Delta T_D$) being one second, in at least the minimum actuation time interval ($T_{MIN}$) of five seconds. Solving Expression (2) yields a maximum bottom speed ($S_{MAX}$) of approximately 2.1 meters per second (4.1 knots), which is slower than the 2.5 meters per second (4.9 knots) if the actuation corresponding to the nominal actuation point 230-2 was not dithered. However, if the dither time difference ($\Delta T_D$) is the maximum dither time difference, the resulting maximum bottom speed ($S_{MAX}$) could be maintained during a marine survey for any dither time difference ($\Delta T_D$) up to and including the maximum dither time difference, while maintaining the minimum actuation time interval. Therefore, the maximum bottom speed could be 2.1 meters per second (4.1 knots) throughout a marine survey and maintain at least five seconds between consecutive actuations where the nominal distance 238 is 12.5 meters.

Because marine surveys can cover hundreds of kilometers and take months to complete, a decrease or increase in the bottom speed caused by dithering of actuations can have significant impacts on the costs of a marine survey. Reducing the bottom speed can increase costs by increasing a time that it takes to complete the survey. It can be beneficial to maintain a faster bottom speed throughout the marine survey to further reduce the duration and the costs of the marine survey.

Figure 3:
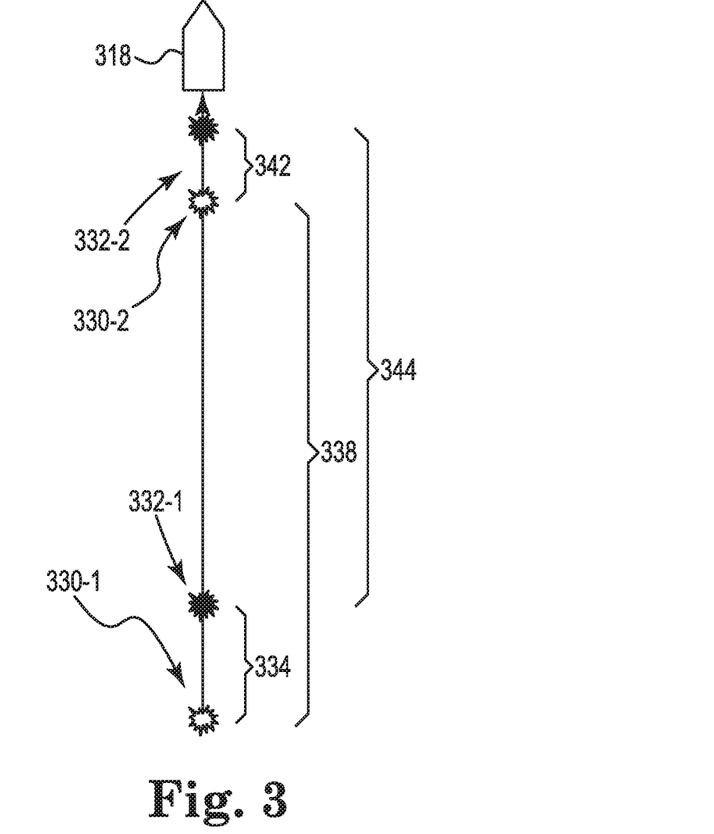
FIG. 3 illustrates constraining a dither time difference to a threshold dither time difference that is less than a maximum dither time difference.

FIG. 3 illustrates constraining a dither time difference to a threshold dither time difference that is less than a maximum dither time difference. The marine survey vessel 318 can be analogous to the marine survey vessel 218 illustrated in FIG. 2. The nominal actuation points 330-1 and 330-2 can be analogous to the nominal actuation points 230-1 and 230-2 illustrated in FIG. 2. A source, such as the source 126 illustrated in FIG. 1, may or may not be actuated at the nominal actuation points based on the dither time corresponding to each actuation point as discussed above. The actuation points 332-1 and 332-2 can be analogous to the actuation points 232-1 and 232-2 illustrated in FIG. 2. Consecutive actuations of a source can be separated by an actuation time interval. As discussed above, a dither time difference can be at most the threshold dither time difference. Such a dither time difference may result in having to reduce the bottom speed in order to maintain the minimum actuation time interval. However, by constraining the dither time difference to a threshold dither time difference that is less than the maximum dither time difference, a faster bottom speed can be maintained throughout a marine survey.

The first dither distance 334 corresponds to a dither time corresponding to the nominal actuation point 330-1 and a second dither distance 342 corresponding to a dither time corresponding to the nominal actuation point 330-2. The actuation distance 344 between actuations corresponds to an actuation time interval between actuations. In the example of FIG. 3, the minimum actuation time interval is five seconds, the nominal distance 338 is 12.5 meters, the maximum dither time is one second, and the maximum dither time difference is one second, as in the example of FIG. 2.

In contrast to the example of FIG. 2, the dither time difference is constrained to a threshold dither time difference that is less than the maximum dither time difference. In the example of FIG. 3, the threshold dither time difference is 0.5 seconds. That is, the dither time difference can be at most 0.5 seconds. Thus, if, for example, the dither time corresponding to a particular actuation is the maximum dither time of one second, then the dither time corresponding to a directly subsequent actuation to the particular actuation can be no less than 0.5 seconds. The randomization scheme can control the dither time and, in this example, ensure that, if the first actuation is dithered by one second, the second actuation has to be dithered by at least 0.5 second. Thus, the actuation distance 344 is at least 11.75 meters, assuming a bottom speed of 2.5 meters per second, and, following Expression (3), to enforce the threshold dither time difference, the dither time corresponding to an actuation can be constrained based upon the dither time corresponding to a directly precedent actuation. For example, if the dither time corresponding to the nominal actuation point 230-1 is one second, then a randomization scheme can constrain the dither time corresponding to the nominal actuation point 230-2 can be at least 0.5 seconds. Negative dither times can be constrained as well. For example, if the dither time corresponding to actuation point 230-1 is −0.2 seconds, then the dither time corresponding to the actuation point 230-2 can be at least −0.7 seconds.

To account for a constraint on the dither time difference ($\Delta T_D$), the dither time difference ($\Delta T_D$) in Expression (2) can be replaced with the threshold dither time difference ($\Delta T_{D_{th}}$), yielding:

$$S_{MAX} = \frac{D_N}{T_{MIN} + \Delta T_{D_{th}}} \quad (5)$$

Solving Expression (5) where the minimum actuation time interval ($T_{MIN}$) between consecutive actuations is five seconds, the nominal distance ($D_N$) 338 is 12.5 meters, and the threshold dither time difference ($\Delta T_{D_{th}}$) is 0.5 seconds yields a maximum bottom speed of approximately 2.3 meters per second (4.4 knots). Thus, in contrast to the example of FIG. 2, by constraining the dither time difference to a threshold dither time difference that is less than the maximum dither time difference, a faster maximum bottom speed can be maintained during a marine survey such that there is at least five seconds (the minimum actuation time interval ($T_{MIN}$)) between consecutive actuations at the actuation points 332-1 and 332-2. In the example of FIG. 3, the bottom speed can be 2.3 meters per second (4.4 knots), which is 0.2 meters per second (0.3 knots) faster than the 2.1 meters per second (4.1 knots) of the example of FIG. 2 and still maintain the minimum actuation time interval ($T_{MIN}$) of five seconds for any dither time difference less than the threshold dither time difference ($\Delta T_{D_{th}}$).

Each actuation of pair of consecutive actuations in a marine survey can have a corresponding dither time where the dither times are constrained to a threshold dither time difference. With respect to FIG. 3, the nominal actuation point 330-1 and the actuation point 332-1 can correspond to an actuation of a source directly precedent to the actuation corresponding to the nominal actuation point 330-2 and the actuation point 332-2. Although not shown in FIG. 3, the nominal actuation point 330-3 and the actuation point 332-3 can correspond to an actuation of a source directly subsequent to the actuation to which the nominal actuation point 330-2 and the actuation point 332-2 correspond. The dither time for each actuation can be constrained such that a reduction of the actuation time interval relative to a directly precedent actuation time interval is at most a threshold dither time difference ($\Delta T_{D_{th}}$). That is, the dither time for the actuation corresponding to the nominal actuation point 332-3 can be constrained such that the actuation time interval between the actuations at the actuation points 332-2 and 332-3 is not reduced by more than the threshold dither time difference ($\Delta T_{D_{th}}$) relative to the actuation time interval between the actuations at the actuation points 332-1 and 332-2. A dither time can be generated corresponding to a subsequent actuation of the source according to a randomization scheme, wherein the subsequent actuation is directly subsequent to the actuation of the source. Another dither time difference between the dither time corresponding to the subsequent actuation of the source at the actuation point 332-3 (not shown in FIG. 3) and the dither time corresponding to the actuation of the source at the actuation point 332-2 can be constrained to the threshold dither time difference. The source can be actuated at the actuation point 332-3 after an actuation time interval following the actuation of the source at the actuation point 332-2, wherein the actuation time interval comprises the nominal time and a dither time corresponding to the subsequent actuation of the source at the actuation point 332-3.

If actuations of a source are spatially dithered, a dither distance difference can be constrained to a threshold dither distance difference. By constraining a dither distance difference to a threshold dither distance difference that is less than a maximum dither distance difference, a faster bottom speed can be maintained during a survey for any dither distance difference up to and including the threshold dither distance difference. For example, the dither distance difference can be the first dither distance 334 minus the second dither distance 342. At least one embodiment in accordance with the present disclosure includes constraining a difference between a first dither distance corresponding to a first actuation of a source and a second dither distance corresponding to a second actuation of a source, where the first actuation is directly precedent to the second actuation. To account for a constraint on the dither distance difference ($\Delta D_D$), the dither distance difference ($\Delta D_D$) in Expression (4) can be replaced with the threshold dither distance difference ($\Delta D_{D_{th}}$), yielding:

$$S_{MAX} = \frac{D_N + \Delta D_{D_{th}}}{T_{MIN}} \quad (6)$$

Figure 4:
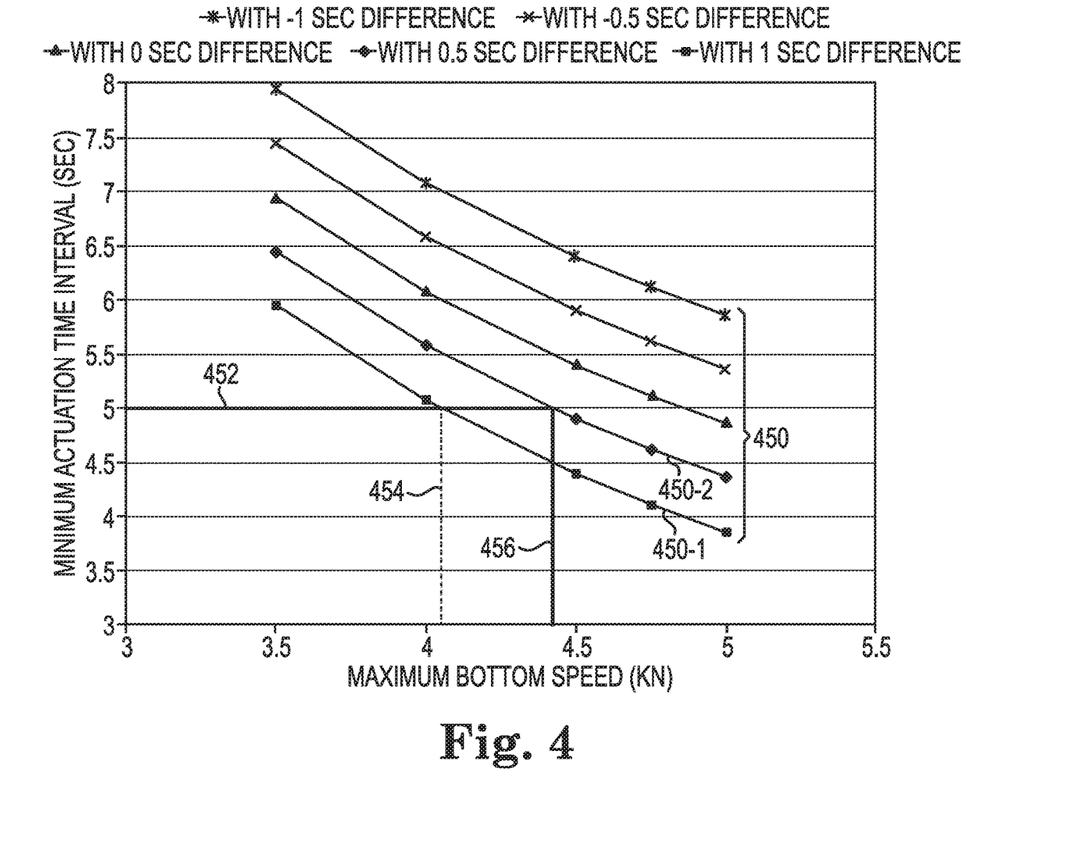
FIG. 4 illustrates a graph relating minimum actuation time intervals, maximum bottom speeds, and dither time differences.

FIG. 4 illustrates a graph relating minimum actuation time intervals ($T_{MIN}$), maximum bottom speeds ($S_{MAX}$), and dither time differences ($\Delta T_D$). FIG. 4 assumes a nominal distance of 12.5 meters between nominal actuation points and a maximum positive dither time of one second, such that the dither time varies between zero and a maximum dither time of one second. The line 452 corresponds to a nominal time of five seconds. The curves 450 collectively correspond to various dither time differences ranging from positive one second to negative one second.

The curve 450-1 corresponds to a dither time difference ($\Delta T_D$) of one second. The curve 450-1 can correspond to the dither time difference ($\Delta T_D$) of one second in the example of FIG. 2. A vertical line 454 can be drawn from the intersection of the line 452 and the curve 450-1 to determine the maximum speed of a marine survey vessel ($S_{MAX}$) than can be maintained throughout the marine survey. FIG. 4 shows that the line 454 corresponds to the maximum bottom speed ($S_{MAX}$) being approximately 4.1 knots (approximately 2.1 meters per second), as in the example of FIG. 2.

The curve 450-2 corresponds to a dither time difference ($\Delta T_D$) of 0.5 seconds. The curve 450-2 can correspond to the dither time difference ($\Delta T_D$) of 0.5 seconds in the example of FIG. 3. A vertical line 456 can be drawn from the intersection of the line 452 and the curve 450-2 to determine the maximum bottom speed ($S_{MAX}$) that can be maintained throughout the marine survey when the dither time difference ($\Delta T_D$) is 0.5 seconds. The line 456 corresponds to the maximum bottom speed ($S_{MAX}$) being approximately 4.4 knots (approximately 2.3 meters per second), as in the example of FIG. 3.

FIG. 4 highlights a benefit of constraining a dither time difference to a maximum amount of time, such as a threshold dither time difference ($\Delta T_{D_{th}}$), that is less than the maximum dither time. For example, the dither time difference ($\Delta T_D$) can be constrained to 0.5 seconds, which is less than the maximum dither time of one second. Comparing the line 454 corresponding to a dither time difference ($\Delta T_D$) of one second to the line 456 corresponding to a dither time difference ($\Delta T_D$) of 0.5 seconds illustrates that a faster maximum bottom speed can be maintained according to at least one embodiment of the present disclosure where the dither time difference ($\Delta T_D$) is constrained to at most 0.5 seconds. Constraining the dither time difference can enable a faster maximum bottom speed while still maintaining the minimum actuation time interval ($T_{MIN}$) for any dither time difference up to and including the threshold dither time difference.

FIG. 4 demonstrates the flexibility of constraining a dither time difference to a threshold dither time difference ($\Delta T_{D_{th}}$) according to at least one embodiment of the present disclosure. For example, instead of using a minimum actuation time interval ($T_{MIN}$) and a threshold dither time difference ($\Delta T_{D_{th}}$) to determine a corresponding maximum bottom speed ($S_{MAX}$), a maximum bottom speed ($S_{MAX}$) and a threshold dither time difference ($\Delta T_{D_{th}}$) can be used to determine a corresponding minimum actuation time interval ($T_{MIN}$). The dither time difference can be constrained to the threshold dither time difference ($\Delta T_{D_{th}}$) based upon a particular maximum bottom speed ($S_{MAX}$) towing the source to maintain at least the minimum actuation time interval ($T_{MIN}$).

Similarly, a minimum actuation time interval ($T_{MIN}$) and a maximum bottom speed ($S_{MAX}$) can be used to determine a corresponding threshold dither time difference ($\Delta T_{D_{th}}$). The dither time difference can be constrained to the threshold dither time difference ($\Delta T_{D_{th}}$) based on a minimum actuation time interval ($T_{MIN}$) to maintain a maximum bottom speed ($S_{MAX}$) towing the source.

Figure 5:
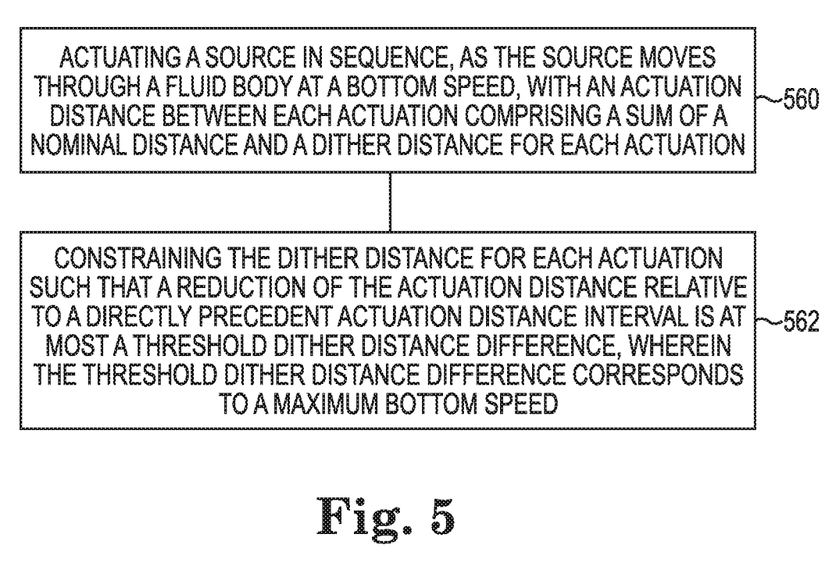
FIG. 5 illustrates a method flow diagram for constraining dithering of source actuations.

FIG. 5 illustrates a method flow diagram for constraining dithering of source actuations. At block 560, the method can include actuate a source in sequence, as the source moves through a fluid volume at a bottom speed, with an actuation distance between each actuation. The actuation distance can comprise a sum of a nominal distance and a dither distance for each actuation. The source can be actuated according to an actuation sequence. The method can include near-continuously recording marine survey data corresponding to the particular and directly subsequent actuations of the source such that the actuation sequence is uninterrupted.

At block 562, the method can include constraining the dither distance for each actuation such that a reduction of the actuation distance relative to a directly precedent actuation distance interval is at most a threshold dither distance difference corresponding to a maximum bottom speed. A difference between the dither distance corresponding to a particular actuation of the source and the dither distance corresponding to a directly subsequent actuation of the source can be constrained to the threshold dither distance difference.

As used herein, "near-continuous" can include without meaningful breaks in the seismic recording. As would be understood by one of ordinary skill in the art with the benefit of this disclosure, operational circumstances can cause intermittent gaps in records (due to equipment failure, etc.), and "near-continuous recording" should be read to include records with intermittent or periodic gaps, whether planned or unplanned as well as records without intermittent or periodic gaps, thus including "continuous records." For simplicity, the term "near-continuous" and "near-continuously" will be used herein and do not exclude "continuous" or "continuously."

Although not shown in FIG. 5, the method can include deblending the marine survey data corresponding to the particular actuation of the source from the marine survey data corresponding to the directly subsequent actuation of the source. Deblending the marine survey data can include distinguishing a signal corresponding to the particular actuation of the source overlapping a signal corresponding to the directly subsequent actuation of the source via the dither distance for the particular actuation and the directly subsequent actuation. Deblending the marine survey data can include distinguishing a signal corresponding to the particular actuation of a first source of a source array overlapping a signal corresponding to a directly subsequent actuation of a second source of the source array via the dither distance for the particular actuation and the directly subsequent actuation.

Although not shown in FIG. 5, the method can include recording marine survey data corresponding only to the particular actuation of the source during a first portion of the actuation distance, and recording marine survey data corresponding to both the particular actuation of the source and the directly subsequent actuation of the source during a second portion of the actuation distance. Although not shown in FIG. 5, the method can include recording marine survey data corresponding to each actuation of the source. Recording the marine survey data can include storing the marine survey data, which was received from a third party that performed the marine survey.

A system for constraining dithering of source actuations can include a data store, a subsystem, and a number of engines, such as a deblending engine. The deblending engine can be configured to distinguish marine survey data corresponding to a first actuation of a source from marine survey data corresponding to a second actuation of a source via a dither time for each actuation. The subsystem and engines can be in communication with a data store via a communication link. The system can represent program instructions and/or hardware of a machine. As used herein, an "engine" can include program instructions and/or hardware, but at least includes hardware. Hardware is a physical component of a machine that enables it to perform a function. Examples of hardware can include a processing resource, a memory resource, a logic gate, etc.

The number of engines can include a combination of hardware and program instructions that is configured to perform a number of functions described herein. The program instructions, such as software, firmware, etc., can be stored in a memory resource such as a machine-readable medium, etc., as well as hard-wired program such as logic.

Hard-wired program instructions can be considered as both program instructions and hardware.

A machine for constraining dithering of source actuations can utilize software, hardware, firmware, and/or logic to perform a number of functions. The machine can be a combination of hardware and program instructions configured to perform a number of functions. The hardware, for example, can include a number of processing resources and a number of memory resources, such as a machine-readable medium or other non-transitory memory resources. The memory resources can be internal and/or external to the machine, for example, the machine can include internal memory resources and have access to external memory resources. The program instructions, such as machine-readable instructions, can include instructions stored on the machine-readable medium to implement a particular function, for example, generating a dither time corresponding to an actuation of the source, constraining a difference between the dither time corresponding to the actuation of the source and a previous dither time corresponding to a directly precedent actuation of the source to a threshold dither time difference, and actuating the source after an actuation time interval following the directly precedent actuation of the source, wherein the actuation time interval comprises the dither time corresponding to the actuation of the source. The set of machine-readable instructions can be executable by one or more of the processing resources. The memory resources can be coupled to the machine in a wired and/or wireless manner. For example, the memory resources can be an internal memory, a portable memory, a portable disk, or a memory associated with another resource, for example, enabling machine-readable instructions to be transferred and/or executed across a network such as the Internet. As used herein, a "module" can include program instructions and/or hardware, but at least includes program instructions.

Memory resources can be non-transitory and can include volatile and/or non-volatile memory. Volatile memory can include memory that depends upon power to store data, such as various types of dynamic random access memory among others. Non-volatile memory can include memory that does not depend upon power to store data. Examples of non-volatile memory can include solid state media such as flash memory, electrically erasable programmable read-only memory, phase change random access memory, magnetic memory, optical memory, and a solid state drive, etc., as well as other types of non-transitory machine-readable media.

The processing resources can be coupled to the memory resources via a communication path. The communication path can be local or remote to the machine. Examples of a local communication path can include an electronic bus internal to a machine, where the memory resources are in communication with the processing resources via the electronic bus. Examples of such electronic buses can include Industry Standard Architecture, Peripheral Component Interconnect, Advanced Technology Attachment, Small Computer System Interface, Universal Serial Bus, among other types of electronic buses and variants thereof. The communication path can be such that the memory resources are remote from the processing resources, such as in a network connection between the memory resources and the processing resources. That is, the communication path can be a network connection. Examples of such a network connection can include a local area network, wide area network, personal area network, and the Internet, among others.

The machine-readable instructions stored in the memory resources can be segmented into a number of modules that when executed by the processing resources can perform a number of functions. As used herein a module includes a set of instructions included to perform a particular task or action. The number of modules can be sub-modules of other modules. Furthermore, the number of modules can comprise individual modules separate and distinct from one another.

In accordance with a number of embodiments of the present disclosure, a geophysical data product may be produced. The geophysical data product may include, for example, field data recorded during a survey utilizing the above-described techniques. Geophysical data may be obtained and stored on a non-transitory, tangible computer-readable medium. In some instances, once onshore in the United States, geophysical analysis may be performed on the geophysical data product. In some instances, geophysical analysis may be performed on the geophysical data product offshore according to techniques described herein or known in the art, and stored on a computer-readable medium, to produce an enhanced geophysical data product.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Various advantages of the present disclosure have been described herein, but embodiments may provide some, all, or none of such advantages, or may provide other advantages.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A system, comprising:
a controller configured to:
actuate a source in sequence with an actuation time interval between each actuation comprising a sum of a nominal time and a respective dither time for each actuation; and
constrain the respective dither time for each actuation such that a reduction of the actuation time interval relative to a directly precedent actuation time interval is at most a threshold dither time difference;
wherein bottom speed refers to a speed of the source relative to a seafloor; and
wherein the threshold dither time difference corresponds to a bottom speed of the source that provides at least a minimum actuation time interval for the source, taking into account the nominal time and the respective dither times.

2. The system of claim 1, wherein the respective dither time for each actuation corresponds to a distance offset from each of a plurality of nominal actuation points, wherein the plurality of nominal actuation points are spaced apart at a nominal distance.

3. The system of claim 1, wherein the controller is further configured to:
- actuate a first source of a source array with a first respective dither time;
- directly subsequent to the actuation of the first source, actuate a second source of the source array after the actuation time interval comprising the nominal time and a second respective dither time; and
- constrain a difference between the first respective dither time and the second respective dither time to at most the threshold dither time difference.

4. The system of claim 1, further comprising the source, wherein the source comprises at least one of a marine vibrator and an air gun.

5. The system of claim 1, further comprising:
- a deblending engine configured to distinguish marine survey data corresponding to a first actuation of the source from marine survey data corresponding to a second actuation of the source via the respective dither time for the first actuation and the respective dither time for the second actuation.

6. The system of claim 5, wherein the deblending engine is in communication with a data store via a communication link.

7. The system of claim 5, wherein the deblending engine comprises programming instructions and hardware.

8. The system of claim 1, wherein:
- the source comprises first and second sources of a source array.

9. The system of claim 8, wherein:
- the first source is coupled to a first marine survey vessel and the second source is coupled to a second marine survey vessel.

10. A non-transitory machine-readable medium storing instructions executable by a processing resource to:
- actuate a source in sequence with an actuation distance between each actuation comprising a sum of a nominal distance and a respective dither distance for each actuation; and
- constrain the respective dither distance for each actuation such that a reduction of the actuation distance relative to a directly precedent actuation distance is at most a threshold dither distance difference,
- wherein the threshold dither distance difference maintains at least a minimum actuation time interval consistent with the nominal distance between each actuation of the source and the respective dither distances.

11. The medium of claim 10, further storing instructions to constrain a difference between the respective dither distance corresponding to a particular actuation of the source and the respective dither distance corresponding to a directly subsequent actuation of the source to the threshold dither distance difference.

12. The medium of claim 10, further storing instructions to record marine survey data corresponding to the particular actuation and a directly subsequent actuation of the source near-continuously.

13. The medium of claim 10, further storing instructions to distinguish a signal corresponding to the particular actuation of the source overlapping a signal corresponding to a directly subsequent actuation of the source via the respective dither distance for the particular actuation and the respective dither distance for the directly subsequent actuation.

14. The medium of claim 10, further storing instructions to:
- record marine survey data corresponding only to the particular actuation of the source during a first portion of the actuation distance; and
- record marine survey data corresponding to both the particular actuation and a directly subsequent actuation of the source during a second portion of the actuation distance.

15. A non-transitory machine-readable medium storing instructions executable by a processing resource to:
- generate a respective dither time corresponding to an actuation of a source; and
- constrain a dither time difference between the respective dither time corresponding to the actuation of the source and a previous dither time corresponding to a directly precedent actuation of the source to a threshold dither time difference based upon a particular bottom speed to be maintained during a marine survey,
- wherein the particular bottom speed provides at least a minimum actuation time interval between actuations of the source; and
- wherein bottom speed refers to a speed of the source relative to a seafloor.

16. The medium of claim 15, wherein the nominal time is five seconds, and
- wherein the threshold dither time difference is approximately 0.5 seconds and corresponds to the particular bottom speed being approximately 4.4 knots.

17. The medium of claim 15, wherein the instructions to constrain the dither time difference comprise instructions to constrain the dither time difference to the threshold dither time difference based upon a nominal time that is necessary to maintain a maximum bottom speed.

18. The medium of claim 15, further storing instructions to:
- generate another respective dither time corresponding to a directly subsequent actuation of the source according to a randomization scheme; and
- constrain another dither time difference between the other respective dither time corresponding to the directly subsequent actuation of the source and the respective dither time corresponding to the actuation of the source to the threshold dither time difference.

19. The medium of claim 18, further storing instructions to actuate the source after an actuation time interval following the actuation of the source, wherein the actuation time interval comprises a nominal time and the other respective dither time corresponding to the directly subsequent actuation of the source.

* * * * *